US008245304B1

(12) United States Patent
Chen et al.

(10) Patent No.: US 8,245,304 B1
(45) Date of Patent: Aug. 14, 2012

(54) AUTONOMOUS SYSTEM-BASED PHISHING AND PHARMING DETECTION

(75) Inventors: Chao-Yu Chen, Taipei (TW); Tse-Min Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1227 days.

(21) Appl. No.: 11/426,554

(22) Filed: Jun. 26, 2006

(51) Int. Cl.
 *G06F 21/00* (2006.01)
(52) U.S. Cl. .......... 726/26; 709/223; 709/225; 709/245; 370/233; 370/395; 455/457; 705/347
(58) Field of Classification Search ..................... 726/22, 726/26
 See application file for complete search history.

(56) References Cited

U.S. PATENT DOCUMENTS

| | | | |
|---|---|---|---|
| 6,678,717 B1* | 1/2004 | Schneider | 709/203 |
| 7,120,934 B2* | 10/2006 | Ishikawa | 726/23 |
| 7,420,958 B1* | 9/2008 | Marques | 370/351 |
| 7,496,651 B1* | 2/2009 | Joshi | 709/223 |
| 7,565,426 B2* | 7/2009 | Jones et al. | 709/224 |
| 7,966,310 B2* | 6/2011 | Sullivan et al. | 707/709 |
| 2002/0078202 A1* | 6/2002 | Ando et al. | 709/225 |
| 2004/0042596 A1* | 3/2004 | Kim et al. | 379/112.01 |
| 2004/0148520 A1* | 7/2004 | Talpade et al. | 713/201 |
| 2005/0039086 A1* | 2/2005 | Krishnamurthy et al. | 714/57 |
| 2005/0198269 A1* | 9/2005 | Champagne et al. | 709/224 |
| 2006/0021031 A1* | 1/2006 | Leahy et al. | 726/22 |
| 2006/0069697 A1* | 3/2006 | Shraim et al. | 707/102 |
| 2007/0153763 A1* | 7/2007 | Rampolla et al. | 370/351 |
| 2007/0206605 A1* | 9/2007 | Ansari et al. | 370/395.5 |
| 2007/0253413 A1* | 11/2007 | Citron et al. | 370/389 |
| 2008/0028467 A1* | 1/2008 | Kommareddy et al. | 726/23 |

OTHER PUBLICATIONS

Cross Site Reference Forgery An introduction to a common web application weakness (http://www.isecpartners.com/files/XSRF_Paper_0.pdf) Jesse Burns ©2005, Information Security Partners, LLC.*
Large-Scale Automatic Classification of Phishing Pages|http://www.isoc.org/isoc/conferences/ndss/10/pdf/08.pdf|Colin Whittaker; Brian Ryner; Marria Nazifi| 2008| pp. 1-14.*

* cited by examiner

*Primary Examiner* — Taghi Arani
*Assistant Examiner* — Mahfuzur Rahman
(74) *Attorney, Agent, or Firm* — IPSG, P.C., Intellectual Property Law

(57) ABSTRACT

Methods for detecting an attempt to perpetrate fraud on a user utilizing a client-supplied link and a client-supplied IP address from a user computer. The method ascertains a first autonomous system number ("first AS number") from the client-supplied IP address and a second autonomous system number ("second AS number") from the client-supplied link. If the first AS number and the second AS number are not AS group peers, a pharming attempt is detected. Alternatively or additionally, the method includes analyzing a content of a webpage that is accessed using the client-supplied IP address to ascertain an identity of an apparent owner of the webpage and ascertaining a third autonomous system number ("third AS number") from the identity of the apparent owner of the webpage. If the first AS number and the third AS number are not AS group peers, a phishing attempt is detected.

20 Claims, 5 Drawing Sheets

AUTONOMOUS SYSTEM-BASED PHISHING AND PHARMING DETECTION

BACKGROUND OF THE INVENTION

Phishing and pharming represent fraudulent techniques to obtain confidential information (such as user name, password, credit card information, etc.) from computer users for misuse. In phishing, the phisher sends an apparently official electronic communication (such as an official looking email) to the victim. For example, if a phisher wishes to obtain confidential information to access a victim's account at XYZ bank, the email would typically come from an XYZ bank email address and contain official-looking logos and language to deceive the victim into believing that the email is legitimate.

Further, the phisher's email typically includes language urging the victim to access the website of XYZ bank in order to verify some information or to confirm some transaction. The email also typically includes a link for use by the victim to supposedly access the website of XYZ bank. However, when the victim clicks on the link included in the email, the victim is taken instead to a sham website set up in advance by the phisher. The sham website would then ask for confidential information from the victim. Since the victim had been told in advance that the purpose of clicking on the link is to verify some account information or to confirm some transaction, many victims unquestioningly enter the requested information. Once the confidential information is collected by the phisher, the phisher can subsequently employ the information to perpetrate fraud on the victim by stealing money from the victim's account, by purchasing goods using the account funds, etc.

Because phishers actually divert the victim to another website other than the website of the legitimate business that the victim intended to visit, some knowledgeable users may be able to spot the difference in the website domain names and may become alert to the possibility that a phishing attack is being attempted. For example, if a victim is taken to a website whose domain name "http://218.246.224.203/icons/cgi-bin/xyzbank/login.php" appears in the browser's URL address bar, that victim may be alert to the fact that the phisher's website URL address is different from the usual "http://www.xyzbank.com/us/cgi-bin/login.php" and may refuse to furnish the confidential information out of suspicion.

Pharming may be thought of as a specialized type of phishing attack in which there are, from the victim's perspective, no detectable changes to the domain name. In a pharming attack, the local DNS cache or DNS server is compromised, allowing a pharmer to associate a legitimate domain name (e.g., xyzbank.com) with the IP address associated with a sham website operated by pharmer. Since the DNS caches or DNS servers are mechanisms that are responsible for resolving domain names into IP addresses, the compromised DNS cache or DNS server would associate the host name xyzbank.com with the IP address 218.246.224.203 (i.e., the IP address of the fraudster's website in the previous example). Accordingly, when the victim types in the URL address www.xyzbank.com, the compromised DNS cache or DNS server would translate this URL address to the IP address 218.246.224.203 that is associated with the pharmer's sham website. Thus, even though the victim is taken to the pharmer's website, the domain address shown on the web browser's URL address bar still shows "http://www.xyzbank.com . . . ". Therefore, it is impossible even for the most astute computer user to detect that a pharming attack is taking place.

One approach to detecting phishing and pharming relies on detecting the fraudster's URL signature (e.g., domain name and/or other characteristics), which may be acquired over time from spam emails and user reports. However, this approach is passive since it relies on the cooperation of users and can only detect known phishers. For newly created phishing websites, detection is not possible until the fraudster's URL signature is collected, such as after a user reports a phishing attack.

Another approach is to maintain an IP address list of well-known websites (i.e., an IP address white list), and to compare the IP address of an unknown website with the IP address white list. If the IP address of the unknown website is not in the IP address white list, the unknown website is flagged as potential phisher. However, the maintenance of such an IP address white list is time-consuming. Further, individuals and organizations often change their IP addresses for legitimate reasons. Since it is impossible to update the IP address white list in real time to keep up with IP address changes (assuming that the changes are reported at all), this approach is error-prone and suffers from a high percentage of false alarms.

SUMMARY OF INVENTION

The invention relates, in an embodiment, to a computer-implemented method for detecting an attempt to perpetrate fraud on a user. The method includes receiving a client-supplied link and a client-supplied IP address from a user computer. The client-supplied link represents a link to a target website which the user is attempting to access. The client-supplied IP address represents an IP address ascertained by the user computer to be an IP address associated with the target website. The method also includes ascertaining a first autonomous system number ("first AS number") from the client-supplied IP address. The method further includes ascertaining a second autonomous system number ("second AS number") from the client-supplied link. If the first AS number and the second AS number do not represent AS group peers, the method includes providing a warning to the user computer to alert the user of a first potential fraud being attempted.

In another embodiment, the invention relates to a computer-implemented method for detecting an attempt to perpetrate fraud on a user. The method includes receiving a client-supplied IP address from a user computer. The client-supplied IP address representing an IP address ascertained by the user computer to be an IP address associated with a target website which the user is attempting to access. The method includes ascertaining a first autonomous system number ("first AS number") from the client-supplied IP address. The method additionally includes analyzing a content of a webpage that is accessed using the client-supplied IP address to ascertain an identity of an apparent owner of the webpage. The method also includes ascertaining a second autonomous system number ("second AS number") from the identity of the apparent owner of the webpage. If the first AS number and the third AS number do not represent AS group peers, the method includes providing a warning to the user computer to alert the user of a potential fraud being attempted.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
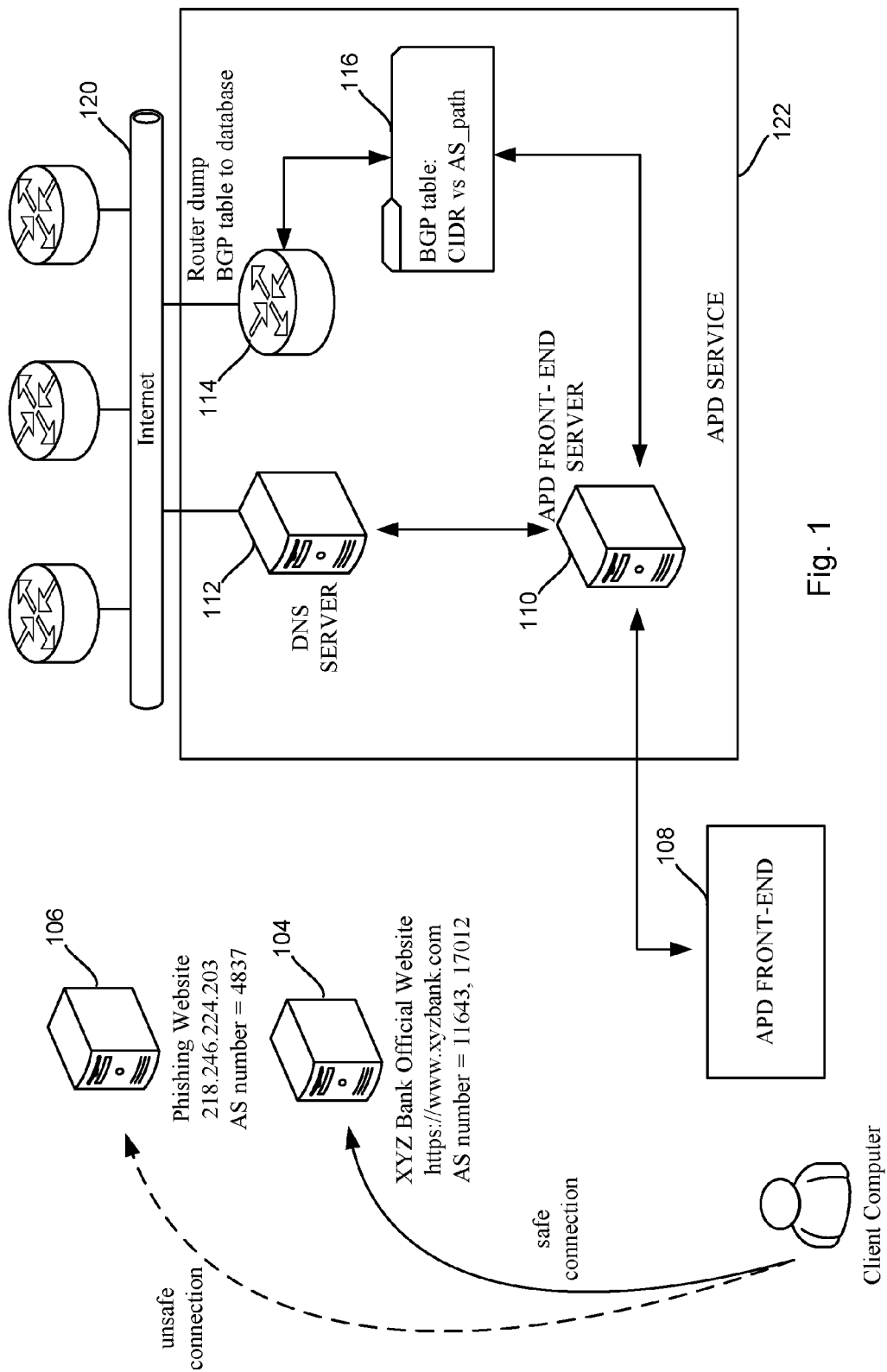
FIG. 1 shows, in accordance with an embodiment of the present invention, a system-view of the AS-based Phishing/Pharming Detection Arrangement (APDA), including both the APD agent and the APD service.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, there are provided methods and systems for detecting a phishing/pharming attack by resolving the target website's IP address, the target website's URL link, and the target website's content into various Autonomous System (AS) paths. These AS paths are then resolved into a plurality of AS numbers. The AS numbers are then compared against one another to detect the presence of possible phishing or pharming attacks.

In an embodiment, the AS-based Phishing Detection Arrangement (APDA) comprises two main components: a client-side agent and an external service. The client-side agent, referred to herein as the AS-based Phishing Detection agent or APD agent, represents the software and/or hardware residing in the user's computer that intercepts attempted website access and suspends such attempt until a determination is made that the attempted access is safe. As the term is employed herein, the user computer can be any network accessible device that is capable of accessing internet sites, e.g., a desktop computer, a laptop or palmtop computer, a cellular phone, an electronic personal digital assistance (PDA) or any other network accessible device. While the attempted access is suspended, the ADP agent forwards the target website's URL link and the target website's IP address to the AS-based Phishing Detection service (APD service).

The target website's IP address is ascertained by the user's computer (in cooperation with DNS servers) from the target website's URL link. For example, if the target website's URL link is "http://otherxyzbank.com/index.html", the user computer may employ the host name www.otherxyzbank.com, which it ascertains from the target website's URL link, to query DNS servers (or the local DNS cache) and to obtain the target website's IP address. If the URL link is already in IP format, for example, http://1.2.3.4/index.html, DNS resolve is not needed.

For clarification, the target website represents the website that the user is attempting to access. This target website may represent a legitimate website or a sham website that a fraudster has tricked the user into visiting. As the term is employed herein, an autonomous system ("AS") is one network or sets of networks under a single administrative control. An autonomous system may be, for example, the set of all computer networks owned by a company, or a college. Companies and organizations may own more than one autonomous system, but the idea is that each autonomous system is managed independently for routing purposes, such as for use by routing protocols such as BGP (Border Gateway Protocol). Since it is possible for a company or organization (i.e., entity) to own more than one Autonomous system, the set of autonomous systems owned by a single entity is referred to herein as an Autonomous System group ("AS group").

An Autonomous System path ("AS path") is a list of all the autonomous systems that a specific route passes through to reach a destination. The AS path is displayed as a series of autonomous system (AS) numbers separated by spaces, with the originator's AS number at the end of the path, and the next AS hop from the current router's location in the beginning of the path.

The APD service is external to the user computer and may be implemented by servers coupled to the internet, for example. As discussed, the APD service receives the target website's URL link and the target website's IP address from the user's computer to analyze whether the attempted access is safe. For clarity, the target website's URL link and the target website's IP address received from the user's computer are referred to herein as the client-supplied URL link and the client-supplied IP address respectively. The APD service then employs the client-supplied IP address to look up an associated Autonomous System (AS) path. As is known, AS path is built with the last AS number being the seed and additional AS numbers appended to this last AS number as the path is built from AS hop to AS hop. The last AS number in this AS path is designated AS1 and represents the Autonomous System associated with the client-supplied IP address. Autonomous Systems, AS paths and AS numbers will be discussed in details later herein.

The APD then analyzes the client-supplied URL link to resolve a host name, from which an IP address is obtained via DNS servers. For clarity, this IP address, which the APD server resolves from the host name that is included in the client-supplied URL link, is called the server-resolved IP address. The APD service then employs the server-resolved IP address to look up an associated Autonomous System (AS) path. The last AS number in this second AS path is designated AS2. Note that the second AS path is obtained by the APD service independently using the client-supplied URL link (i.e., not from the client-supplied IP address). Accordingly, even if the user's local DNS cache or DNS server service associated with the user is compromised as in the case of a pharming attack, this independent verification would likely result in different AS paths as well as different values for AS1 and AS2 (since AS1 is acquired using the client-supplied IP address and AS2 is acquired using the server-resolved IP address). If AS1 and AS2 do not belong in the same AS group, a pharming attack is deemed to be in progress, and the APD agent is notified so that appropriate remedial steps may be taken.

If these two AS path numbers (AS1 and AS2) belong in the same AS group (i.e., they are AS group peers), it is still possible that a phishing attack exists. Accordingly, a further check is performed. First, the content of the target webpage associated with the client-supplied IP address is analyzed to ascertain the identity of the legitimate host (e.g., xyzbank). Since fraudsters want to deceive their victims into believing that the victim is viewing the website belonging to the legitimate host (e.g., xyzbank), a fraudster would include information on the webpage that would look familiar to the victim in order to avoid raising suspicion. In the example of XYZ bank, the sham webpage presented by the fraudster would include, for example, the logo of XYZ bank, the address and phone numbers of XYZ bank, etc. By analyzing the content of this webpage, it is possible to ascertain the identity of the apparent owner of the website (which may or may not be the same as the actual owner of the website). In the absence of fraud, the apparent owner identity gleaned from the webpage content would be the same as the actual owner of the website, i.e., the legitimate host. If a phishing fraud is being attempted, the apparent owner (i.e., the legitimate host) would be different from the actual owner (i.e., the phisher or fraudster). The legitimate host information is then employed to map into a legitimate host domain name (e.g., xyzbank.com). The legitimate host domain name (e.g., xyzbank.com) is then employed to ascertain the legitimate host's IP address via DNS servers. The legitimate host's IP address is then employed to obtain the AS path. The last AS number of this AS path is designated AS3.

If AS3 and the previously-determined AS1 do not belong in the same AS group (referred to herein as "AS group peers"), a phishing attack is deemed to be in progress, and the APD agent is notified so that appropriate remedial steps may be taken. If AS1, AS2 and AS3 all belong in the same group, then the target website is deemed to be safe for use.

The features and advantages of the invention may be better understood with reference to the figures and discussions that follow. FIG. 1j shows, in accordance with an embodiment of the present invention, a system-view of the AS-based Phishing/Pharming Detection Arrangement (APDA), including both APD agent 108 and APD service 122. APD agent 108 represents the software agent installed in the client computer 102 (which may include a laptop computer, a desktop computer, a hand-held computing device, or even a web-enabled cell phone) for intercepting attempted website accesses and suspending acting on such attempts until a determination that such attempt is safe has been made.

For example, APD agent 108 may represent a plug-in that works cooperatively with the web browser in client computer 102 to intercept website accesses. However, APD agent may also represent any software and/or hardware implementation that is capable of intercepting a website access attempt and suspending such attempted access until a safe signal is received from APD service before proceeding.

Upon detecting an attempted website access (e.g., when the user clicks on a link that links to "http://www.otherxyzbank.com" or when the user types in the URL "http://www.otherxyzbank.com" into the URL address bar of a web browser) APD agent 108 causes client computer 102 to suspend the attempted access (e.g., by temporarily suspending the attempt by the browser). Next, APD agent 108 or client computer 102 resolves the IP address of the target website (i.e., otherxyzbank.com) by accessing the local DNS cache or DNS servers (which may be provided by the internet service provider or ISP, for example). As mentioned, the IP address is resolved by ascertaining the host name from the URL link, and looking up the IP address using the host name and the local DNS cache or DNS servers. This resolved IP address represents the target website's IP address and is referred to herein as the client-provided IP address (since the client computer obtains this IP address and will subsequently furnishes this IP address to the APD service for detection purposes). The target website's URL link is referred to herein as the client-supplied URL link.

The client-supplied IP address and the client-supplied URL link are then provided to APD front-end server 110 of APD service 122. APD front-end server 110 first employs the client-supplied IP address to resolve down to an AS path. In an embodiment, BGP (Border Gateway Protocol) is employed to ascertain an AS path from a client-supplied IP address. BGP is a well-known protocol and is widely published in publicly available documents including Request for Comments (RFCs), which are documents maintained by the Internet Society or ISOC. RFC 1771 and the subsequent RFC 4271 discuss BGP in details and may be viewed at, for example, the official website (www.ietf.org) for the Internet Engineering Taskforce, also known as the IETF.

Thus, APD front-end server 110 consults BGP table 116 (which represents a database storing BGP table router dump) to determine the AS path from the client-supplied AS path. The last number of the AS path is ascertained and designated AS1. Note that is not absolutely necessary that the BGP table be implemented in a database. While the use of a BGP table can provide IP to AS number mapping. such mappings be implemented by any technology such as database, a program to obtain AS number of a given IP in realtime, etc.

Further, APD front-end server 110 independently resolves the IP address from the client-supplied URL link. This server-resolved IP address is then employed to ascertain a second AS path, using, for example, BGP table 116. The last number of the second AS path is ascertained and designated AS2. Note that since AS1 is acquired using the client-supplied IP address and AS2 is acquired using the server-resolved IP address, AS2 is likely to be different from AS1 if the user's local DNS cache or DNS server service associated with the user is compromised as in the case of a pharming attack.

If AS1 and AS2 do not belong in the same AS group, a pharming attack is deemed to be in progress, and the APD agent is notified so that appropriate remedial steps may be taken.

On the other hand, if AS1 and AS2 belong to the same AS group, the possibility of a phishing attack still exists. In this case, APD front-end server 110 performs a further check by first analyzing the content of the webpage associated with the client-supplied IP address. As discussed, since fraudsters almost always include information on the sham webpage to impersonate the legitimate host, the included information may be employed to ascertain the legitimate host. The legitimate host information is then employed to map into a legitimate host domain name (e.g., xyzbank.com), from which the legitimate host's IP address may be obtained via DNS servers. The legitimate host's IP address is then employed to obtain the AS path. The AS number of this third AS path is designated AS3.

If AS1 and AS3 do not belong in the same AS group, a phishing attack is deemed to be in progress, and the APD agent is notified so that appropriate remedial steps may be taken.

Figure 2:
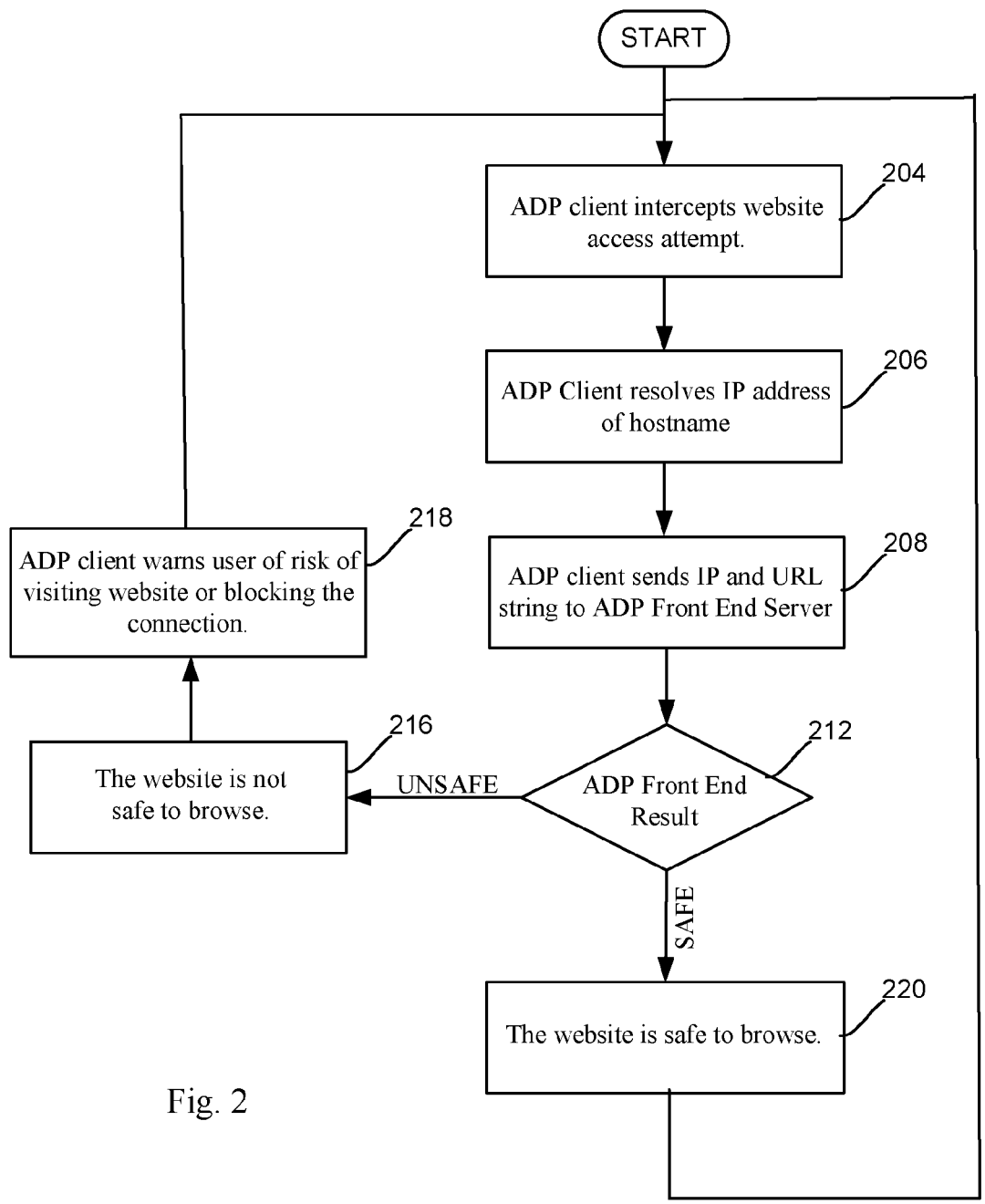
FIG. 2 shows, in accordance with an embodiment of the present invention, the steps taken by the APD agent to ensure safe website access.

FIG. 2 shows, in accordance with an embodiment of the present invention, the steps taken by the APD agent to ensure safe website access. In step 204, the APD agent intercepts the attempted website access and suspends the attempted access. In step 206, the APD agent resolves the IP address from the host name, which is obtained from the URL link. In step 208, the APD agent sends the target website's IP address and the target website's URL link to the APD service for analysis. In step 212, the APD analysis result is received. If the analysis result indicates that the attempted access is not safe (216) due to either phishing or pharming, remedial actions may be taken. Thus, for example, the user is warned of the phishing or pharming attack, and the fraudulent website is blocked from further access (step 218). On the other hand, if the analysis result indicates that the target website is safe to access, the APD agent permits access (220) and the user can begin to browse the target website.

Figure 3:
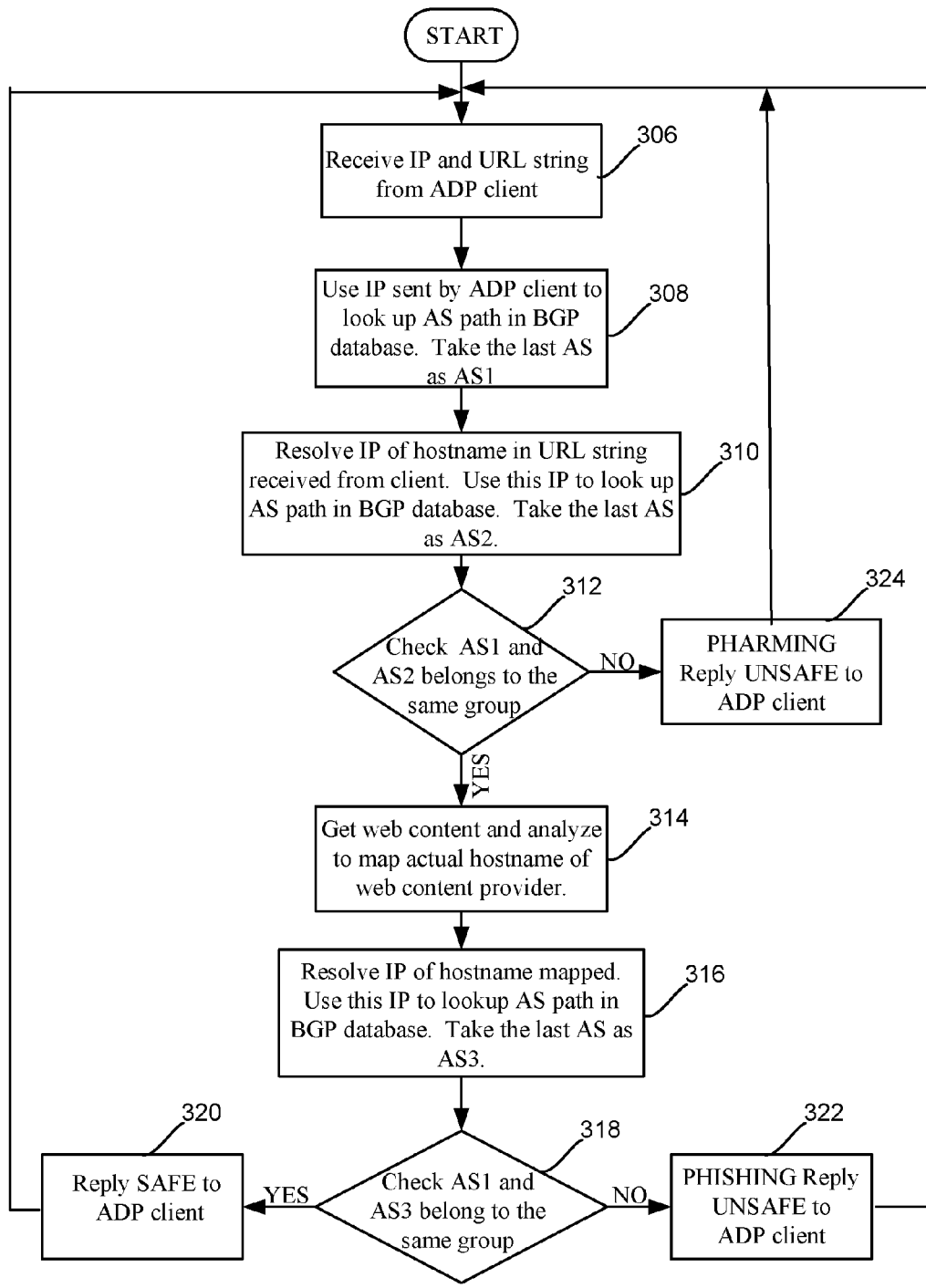
FIG. 3 shows in accordance with an embodiment of the present invention, the steps taken by the APD service to determine whether a website is safe to access from phishing and pharming risks.

FIG. 3 shows in accordance with an embodiment of the present invention, the steps taken by the APD service to determine whether a website is safe to access. In step 306, the client-supplied IP address and the client-supplied URL string are received from the APD agent. In step 308, the AS path is looked up in the BGP database using the client-supplied IP address. The last AS number in the AS path is taken as AS1.

In step 310, the server-resolved IP address is employed to look up the AS path from the BGP database. The server-resolved IP address represents the IP address resolved by the APD service from the host name obtained from the client-supplied URL string. The last AS number from this second AS path is designated AS2.

In step 312, it is ascertained whether AS1 and AS2 belong in the same AS group. If they do not belong in the same AS group (the "NO" branch out of 312), a pharming attack is deemed to be underway, and the APD agent is appropriately warned (324).

On the other hand, if AS1 and AS2 belong I the same AS group (the "YES" branch out of 312), the possibility of a phishing attack still exists. Accordingly, further checks are performed. In step 314, the content of the webpage associated with the client-supplied IP address is analyzed to obtain the identity of the legitimate host. As discussed, the content of the sham webpage almost always includes information about the legitimate host in an effort to deceive the victim into believing that the victim is actually viewing a webpage on the legitimate host's website. Of course, if the webpage in fact belongs to the legitimate host, the information pertaining to the legitimate host would be present. Once the identity of the legitimate host is ascertained, the domain name of the legitimate host may be acquired (using any number of available look-up engines, for example). The domain name is then employed to look up the IP address (using DNS servers for example) and the AS path (using for example BGP tables). The last number of this third AS path is designated AS3.

In step 318, it is ascertained whether AS1 and AS3 belong in the same AS group. If they do not belong in the same AS group (the "NO" branch out of 312), a phishing attack is deemed to be underway, and the APD agent is appropriately warned (322).

On the other hand, if AS1 and AS3 belong in the same AS group (the "YES" branch out of 312), the attempted website access is deemed to be safe, and the APD agent is appropriately notified (320) so that the user's attempted access may now be permitted to proceed.

Figure 4:
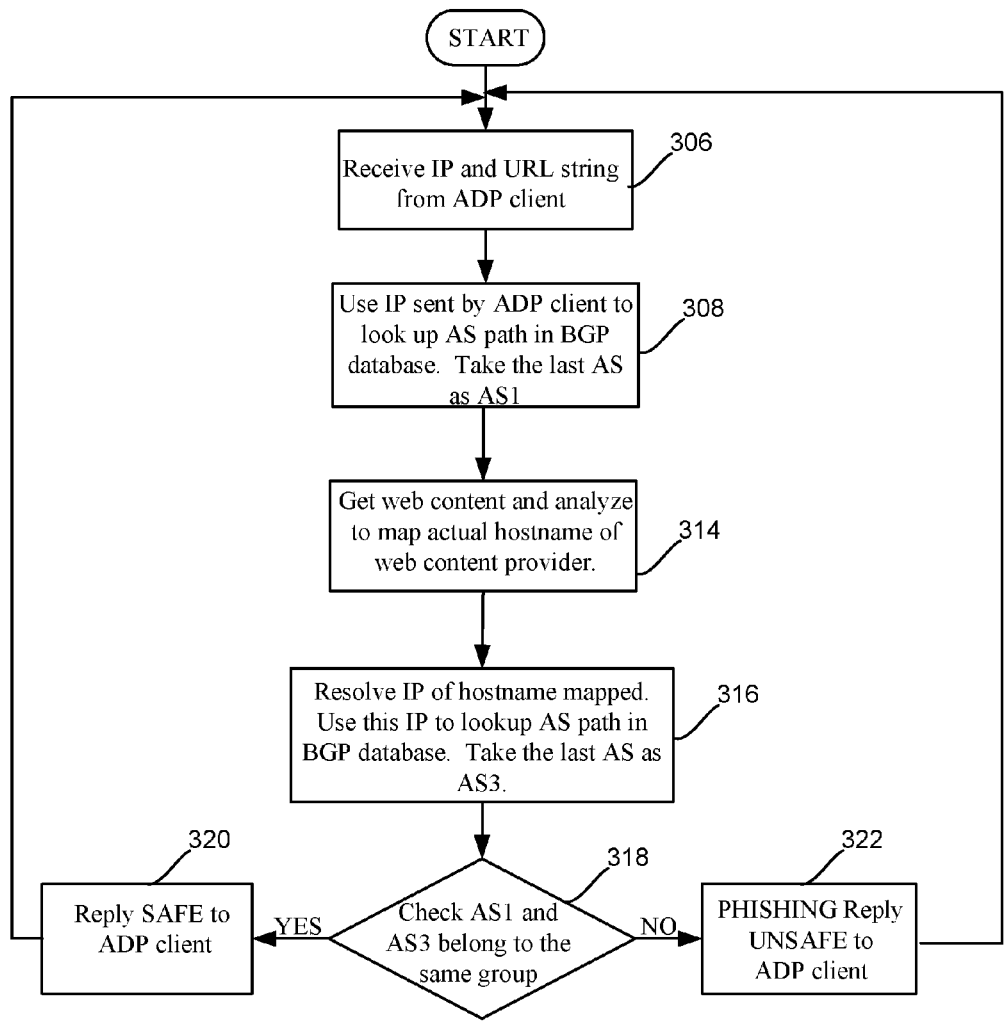
FIG. 4 shows in accordance with an embodiment of the present invention, the steps taken by the APD service to determine whether a website is safe to access from phishing risks.
Figure 5:
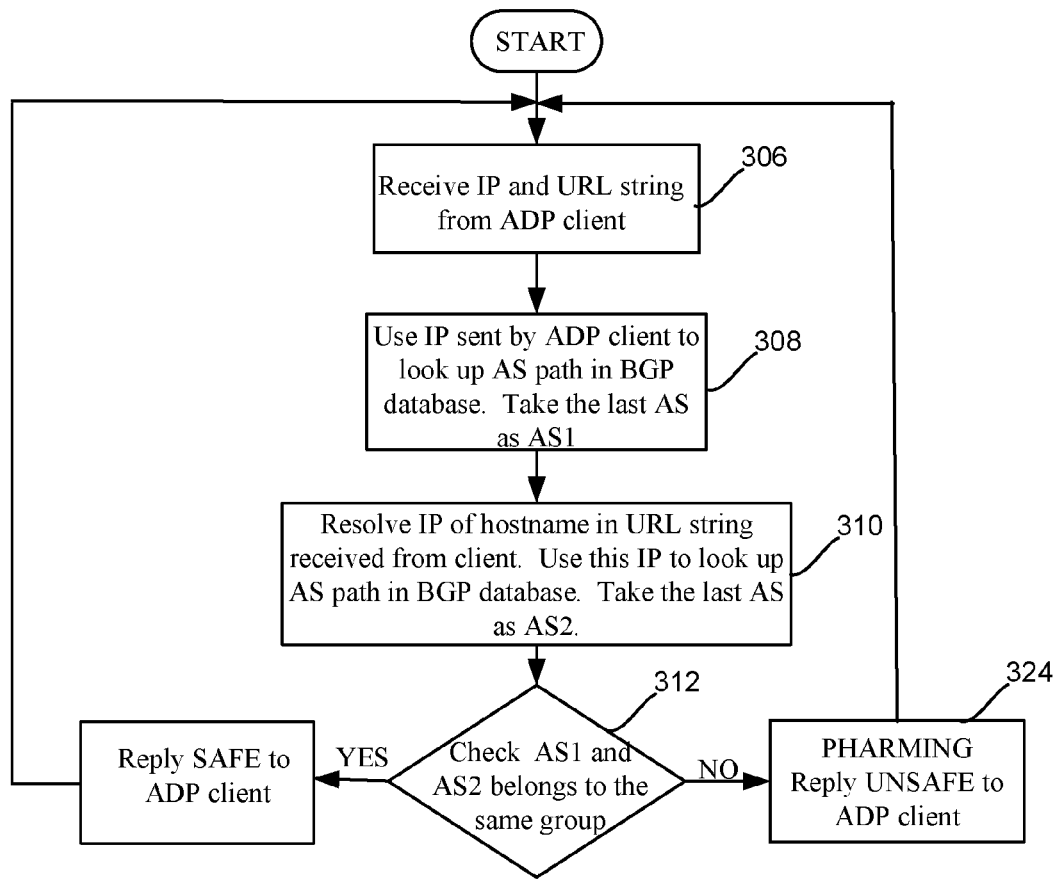
FIG. 5 shows in accordance with an embodiment of the present invention, the steps taken by the APD service to determine whether a website is safe to access from pharming risks.

It is possible to eliminate steps 310, 312, and 324 from FIG. 3 if only phishing detection is desired or if pharming detection by verifying AS1 against AS2 is not deemed necessary. FIG. 4 shows, in accordance with an embodiment of the present invention, a flowchart illustrating the phishing-only detection. Likewise, if only pharming is desired steps 314, 316, 318, 320, and 322 can be eliminated. FIG. 5 shows, in accordance with an embodiment of the present invention, a flowchart illustrating the pharming-only detection.

As can be appreciated from the foregoing, embodiments of the invention employ AS path information to detect phishing and/or pharming attacks. Since AS paths are updated in real time in internet routers, embodiments of the invention can accurately ascertain the existence of a possible attack with a low rate of false alarms even if IP addresses associated with hosts' websites change. In so doing, embodiments of the invention avoid the disadvantages associated with passive, delay-prone approaches such as IP white list or URL signature matching. By requiring the user computer to ascertain the IP address independently from the target website's URL link, and to supply both the client-supplied IP address and client-supplied URL link to the APD service for detection purposes, embodiments of the invention enable the APD service to employ the client-supplied IP address, the client supplied URL link, the server-resolved IP address, and the IP address obtained via content analysis of the webpage pointed to by the client-supplied IP address, to perform independent verifications to efficiently detect phishing and/or pharming attacks.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, although BGP is discussed as the mechanism to ascertain an AS path/AS number from an IP address, the invention is not limited to using BGP and any other approaches for ascertaining an AS path/AS number from an IP address may be employed. It should also be noted that there are many alternative ways of implementing the methods and apparatuses of the present invention. Further, the abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A computer-implemented method for detecting an attempt to perpetrate fraud on a user, the computer-implemented method comprising:

receiving, using a server device, a client-supplied link and a client-supplied IP address from a user computer, said client-supplied link representing a link to a target website which said user computer is attempting to access, said client-supplied IP address representing an IP address ascertained by said user computer to be an IP address associated with said target website;

acquiring a first autonomous system number ("first AS number") using said server device and using said client-supplied IP address;

acquiring a second autonomous system number ("second AS number") using said server device and using said client-supplied link;

after said acquiring said first AS number and after said acquiring said second AS number, determining whether said first AS number and said second AS number are autonomous system group peers ("AS group peers") such that said first AS number and said second AS number belong in a same autonomous system group ("AS group");

analyzing, using said server device, said client-supplied link to resolve a host name;

obtaining a server-resolved IP address using said server device and said host name;

obtaining a second autonomous system path ("second AS path") using said server device and using said server-resolved IP address; and designating the last AS number in said second AS path said second AS number; and after said determining, if said first AS number and said second AS number do not belong in the same AS group, providing a warning to said user computer to indicate a first potential fraud being attempted.

2. The computer-implemented method of claim 1 wherein said first potential fraud represents pharming.

3. The computer-implemented method of claim 1 wherein said client-supplied IP address is ascertained by said user computer from said client-supplied link using one of a local DNS cache and a set of DNS servers that are external to said user computer.

4. The computer-implemented method of claim 1 further comprising:
obtaining a first autonomous system path ("first AS path") using said server device and using said client-supplied IP address, and
designating the last AS number in said first AS path said first AS number.

5. The computer-implemented method of claim 4 wherein said first AS path is obtained using data gathered from routers implementing the Border Gateway Protocol (BGP).

6. The computer-implemented method of claim 1 wherein said second AS path is obtained using data gathered from routers implementing the Border Gateway Protocol (BGP).

7. A computer-implemented method for detecting an attempt to perpetrate fraud on a user, the computer-implemented method comprising:
receiving, using a server device, a client-supplied link and a client-supplied IP address from a user computer, said client-supplied link representing a link to a target website which said user computer is attempting to access, said client-supplied IP address representing an IP address ascertained by said user computer to be an IP address associated with said target website;
acquiring a first autonomous system number ("first AS number") using said server device and using said client-supplied IP address;
acquiring a second autonomous system number ("second AS number") using said server device and using said client-supplied link;
after said acquiring said first AS number and after said acquiring said second AS number, determining whether said first AS number and said second AS number are autonomous system group peers ("AS group peers") such that said first AS number and said second AS number belong in a same autonomous system group ("AS group"); after said determining, if said first AS number and said second AS number do not belong in the same AS group, providing a warning to said user computer to indicate a first potential fraud-being attempted; and
analyzing, using said server device, a content of a webpage that is accessed using said client-supplied IP address to ascertain an identity of an apparent owner of said webpage;
acquiring a third autonomous system number ("third AS number") using said server device and using said identity of said apparent owner of said webpage;
if said first AS number and said third AS number do not represent AS group peers, providing a warning to said user computer to indicate a second potential fraud being attempted.

8. The computer-implemented method of claim 7 further comprising:
obtaining a third autonomous system path ("third AS path") using said server device and using an IP address that is obtained from a host name that is mapped to said apparent owner; and
designating the last AS number in said third AS path said third AS number.

9. The computer-implemented method of claim 8 wherein said third AS path is obtained using data gathered from routers implementing the Border Gateway Protocol (BGP).

10. The computer-implemented method of claim 8 wherein said second potential fraud represents phishing.

11. An article of manufacture comprising a program storage medium having computer readable code embodied therein, said computer readable code being configured for detecting an attempt to perpetrate fraud on a user, the article of manufacture comprising:
computer readable code for receiving, using a server device, a client-supplied link and a client-supplied IP address from a user computer, said client-supplied link representing a link to a target website which said user computer is attempting to access, said client-supplied IP address representing an IP address ascertained by said user computer to be an IP address associated with said target website;
computer readable code for acquiring a first autonomous system number ("first AS number") using said server device and using said client-supplied IP address;
computer readable code for acquiring a second autonomous system number ("second AS number") using said server device and using said client-supplied link;
computer readable code for determining, after said acquiring said first AS number and after said acquiring said second AS number, whether said first AS number and said second AS number are autonomous system group peers ("AS group peers") such that said first AS number and said second AS number belong in a same autonomous system group ("AS group") that includes more than one autonomous system;
computer readable code for obtaining a second autonomous system path ("second AS path") using said server device and using an IP address that is obtained from a host name that is parsed from said client-supplied link;
computer readable code for designating the last AS number in said second AS path said second AS number; and
computer readable code for providing, if said first AS number and said second AS number do not belong in the same AS group, a warning to said user computer to indicate a first potential fraud being attempted, wherein said program storage medium is a non-transitory tangible medium.

12. The article of manufacture of claim 11 wherein said first potential fraud represents pharming.

13. The article of manufacture of claim 11 wherein said client-supplied IP address is ascertained by said user computer from said client-supplied link using one of a local DNS cache and a set of DNS servers that are external to said user computer.

14. The article of manufacture of claim 11 further comprising:
   computer readable code for obtaining a first autonomous system path ("first AS path") using said server device and using said client-supplied IP address; and
   computer readable code for designating the last AS number in said first AS path said first AS number.

15. The article of manufacture of claim 14 wherein said first AS path is obtained using data gathered from routers implementing the Border Gateway Protocol (BGP).

16. The article of manufacture of claim 11 wherein said second AS path is obtained using data gathered from routers implementing the Border Gateway Protocol (BGP).

17. An article of manufacture comprising a program storage medium having computer readable code embodied therein, said computer readable code being configured for detecting an attempt to perpetrate fraud on a user, the article of manufacture comprising:
   computer readable code for receiving, using a server device, a client-supplied link and a client-supplied IP address from a user computer, said client-supplied link representing a link to a target website which said user computer is attempting to access, said client-supplied IP address representing an IP address ascertained by said user computer to be an IP address associated with said target website;
   computer readable code for acquiring a first autonomous system number ("first AS number") using said server device and using said client-supplied IP address;
   computer readable code for acquiring a second autonomous system number ("second AS number") using said server device and using said client-supplied link;
   computer readable code for determining, after said acquiring said first AS number and after said acquiring said second AS number, whether said first AS number and said second AS number are autonomous system group peers ("AS group peers") such that said first AS number and said second AS number belong in a same autonomous system group ("AS group") that includes more than one autonomous system; and
   computer readable code for providing, if said first AS number and said second AS number do not belong in the same AS group, a warning to said user computer to indicate a first potential fraud being attempted, wherein said program storage medium is a non-transitory tangible medium; and
   computer readable code for performing, if said first AS number and said second AS number represent said AS group peers, additional detection by
   analyzing, using said server device, a content of a webpage that is accessed using said client-supplied IP address to ascertain an identity of an apparent owner of said webpage,
   acquiring a third autonomous system number ("third AS number") using said server device and using said identity of said apparent owner of said webpage, and
   providing, if said first AS number and said third AS number do not represent AS group peers, a warning to said user computer to alert said user of a second potential fraud being attempted.

18. The article of manufacture of claim 17 further comprising:
   computer readable code for obtaining a third autonomous system path ("third AS path") using said server device and using an IP address that is obtained from a host name that is mapped to said apparent owner; and
   computer readable code for designating the last AS number in said third AS path said third AS number.

19. The article of manufacture of claim 18 wherein said third AS path is obtained using data gathered from routers implementing the Border Gateway Protocol (BGP).

20. The article of manufacture of claim 18 wherein said second potential fraud represents phishing.

* * * * *